N. R. SMITH.
HEATING MEANS FOR INTERNAL COMBUSTION ENGINES AND AUTOMOBILES.
APPLICATION FILED APR. 23, 1917.
1,326,539.  Patented Dec. 30, 1919.
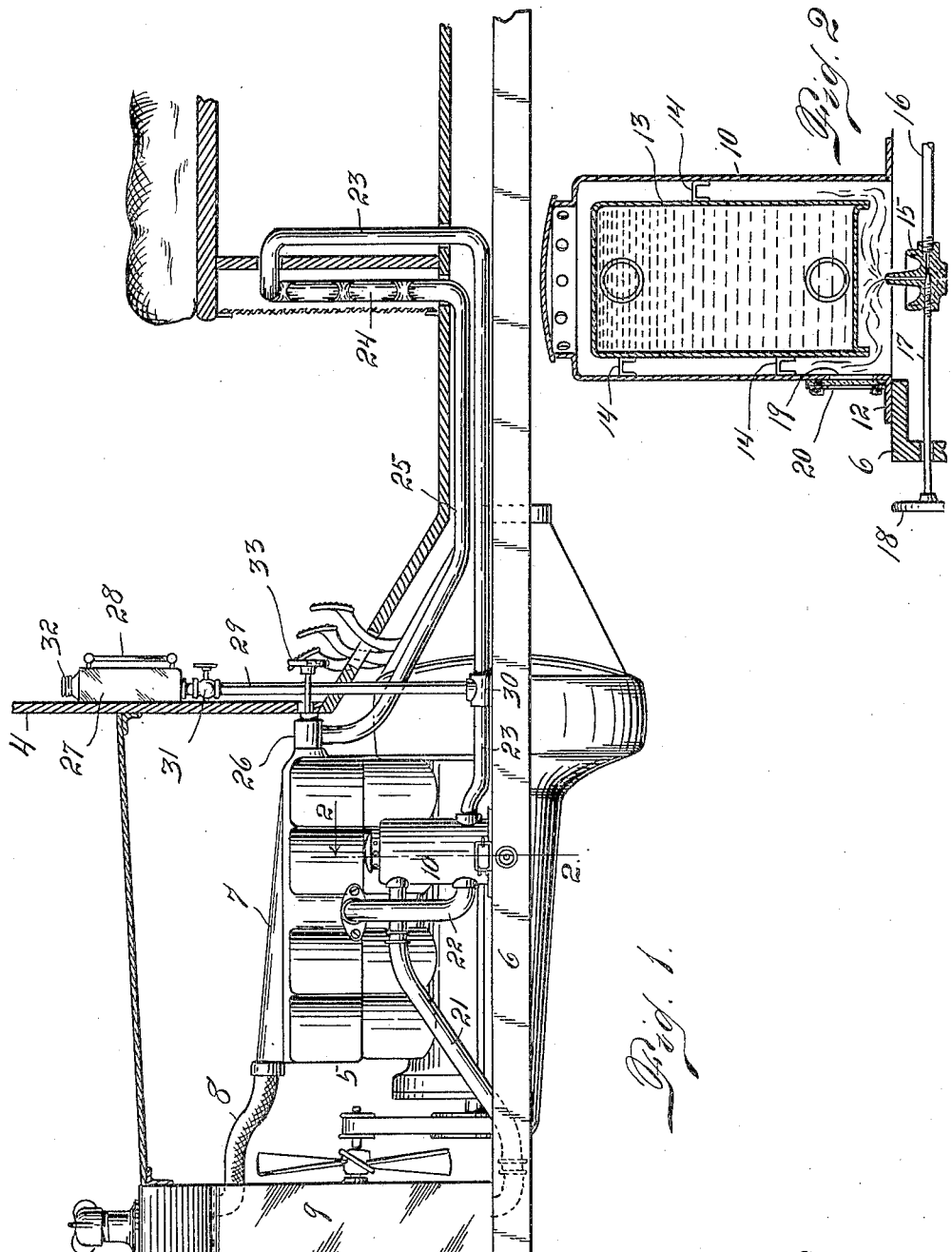
Inventor
Nelson R. Smith.

UNITED STATES PATENT OFFICE.

NELSON R. SMITH, OF DENVER, COLORADO.

HEATING MEANS FOR INTERNAL-COMBUSTION ENGINES AND AUTOMOBILES.

1,326,539.  Specification of Letters Patent.  Patented Dec. 30, 1919.

Application filed April 23, 1917. Serial No. 163,761.

*To all whom it may concern:*

Be it known that I, NELSON R. SMITH, a citizen of the United States, residing at the city and county of Denver and State of Colorado, have invented certain new and useful Improvements in Heating Means for Internal-Combustion Engines and Automobiles; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to means for heating water employed in connection with an internal combustion engine of the water cooled type when the latter is idle, to prevent the water in the cooling system from freezing, and when the engine is mounted upon a vehicle, I also employ other means in connection with the first named means for furnishing heat to the occupants of said vehicle.

My construction, briefly stated, comprises a tank adapted to contain water mounted adjacent the engine and in communication with the water system thereof, and a burner located beneath the said tank for heating the water therein. This tank, as well as the water system, is also in communication with a heater located under the seat of the vehicle or in any other convenient place.

I also provide means for adding water to that already in the system as it may be required, or the said means may be employed as the only means for introducing water into the said system.

Having briefly outlined my improved construction, I will proceed to describe the same in detail, reference being made to the accompanying drawing, in which is illustrated an embodiment thereof. In this drawing:—

Figure 1 is a view of an internal combustion engine mounted upon an automobile, and the latter and the said engine equipped with my improved construction.

Fig. 2 is a section taken on the line 2—2 Fig. 1 looking in the direction of the arrow.

The same reference characters indicate the same parts in all the views.

Let the numeral 5 designate an internal combustion engine mounted upon the framework 6 of an automobile and provided with the usual water jacket 7 connected by means of a pipe 8 with the upper portion of the radiator 9. Mounted adjacent one side of the engine and supported by the base of the latter and the frame-work 6 of the machine, is a circular casing 10 open at its lower extremity which is provided with a circumferential flange 12 resting upon the said support. A tank 13 adapted to contain water is supported within the casing 10, but separated therefrom by means of brackets 14. A gas burner 15 is located beneath the tank 13 and is connected with the gas supply tank of the machine by a pipe 16, the said burner being regulated by a needle valve 17 extending through the frame-work 6 of the vehicle and having a knob 18 applied to its outer extremity for manipulating purposes. The wall of the casing 10 is provided with an opening 19 through which access may be gained to the burner 15 for lighting purposes, and this opening is normally closed by a transparent door 20.

The upper extremity of the tank 13 is connected by a pipe 21 with the lower extremity of the radiator 9, while the lower portion of the said tank is connected by a pipe 22 with the water jacket 7 of the engine. Also attached to the tank 13 and opposite the connection of the latter with the pipe 22, is another pipe 23 which establishes communication between the said tank and a heater 24 located beneath the seat of the machine, said heater comprising a series of convolutions of pipe, and the lower pipe of the series is connected by a pipe 25 with the water jacket of the engine as disclosed at 26. The pipes 23 and 24 are shown in the drawing as merging into the pipe which constitutes the heater 24 and any suitable grating or mesh material is secured in front of the said heater to protect the same, but at the same time to permit heat to radiate outwardly therefrom. It should be understood in this connection that any number of heaters such as 24 may be employed, depending upon the size of the car and number of seats, and I do not wish to limit myself to the exact position of the heater 24 as disclosed in the drawing, since I am aware that it may be located in other convenient places.

An auxiliary water tank 27 provided with a gage 28 is secured to the dash board 4 of the machine, and its lower extremity is connected by a pipe 29 with the pipe 23 as shown at 30, and a valve 31 is located in the said pipe 29 slightly below the auxiliary tank so as to be readily accessible to the chauffeur. The tank 27 is adapted to be filled with water through a neck 32 whereby by opening the valve 31, additional water may be introduced into the water system from time to time as may be required and the amount drawn from the tank 27 can be determined by the gage 28. Furthermore, if desired, the entire water system may be filled by introducing water through the neck 32 of the said auxiliary tank, in which case it would not be necessary to pour any water whatever into the radiator through the neck of the same, and such an arrangement is most convenient, when for instance the ground below and in front of the said radiator is muddy or otherwise objectionable.

In view of the above description, it is believed that the use and operation of my improved construction will be readily understood. When the chauffeur has shut off the engine and intends to leave it stand for a considerable period of time, he will open the door 20 of the casing 10 and light the burner 15 for the purpose of keeping the water hot in the tank 13. This heating of the water in the latter will reverse the circulation through the system since the hot water will leave the top of the tank 13 through the pipe 21 and be introduced into the bottom of the radiator 9 from the upper portion of which it will flow through the pipe 8 into the water jacket 7 and then through the pipe 22 back into the lower portion of the tank 13. In this manner, the water throughout the system will be kept heated, which will prevent the same from freezing within the radiator and water jacket no matter how long the engine remains idle.

When the engine is in operation, the circulation through the water system will be in the same direction as usual, but will include the pipe 23, heater 24, and pipe 25, and as the warm or hot water passes through the convolutions forming the said heater 24, heat will radiate therefrom and warm the occupants of the machine. The circulation through the pipes 23 and 25 and the heater 24 can be shut off when desired by manipulating a valve stem 33 protruding through the dash board 4.

Having thus described my invention, what I claim is:

1. In combination with the water jacket and radiator of an internal combustion engine, a tank adapted to contain water mounted adjacent the engine, a burner located beneath said tank, a pipe connecting the upper portion of the tank with the lower extremity of the radiator, and a second pipe connecting the lower portion of said tank with the water jacket of the engine.

2. In combination with the water jacket and radiator of an internal combustion engine, a tank adapted to contain water mounted adjacent the engine, a valve controlled burner located beneath said tank and connected with the gas supply, a pipe forming communication between the upper portion of the tank and the lower extremity of the radiator, and a second pipe forming communication between the lower portion of said tank and the water jacket of the engine, said tank as a whole being positioned below said water jacket as a whole.

3. In combination with the water jacket and radiator of an internal combustion engine, a casing mounted adjacent the engine, a tank adapted to contain water supported in said casing, but separated therefrom, a burner located beneath said tank, a pipe connecting the upper portion of the latter with the lower extremity of the radiator, and a second pipe connecting the lower portion of the tank with the water jacket of the engine.

4. In combination with the water system of an internal combustion engine mounted upon a vehicle, a tank adapted to contain water supported adjacent the engine and in communication with the said system, a heater also mounted upon the vehicle, a pipe connecting the said heater with the water tank, and a second pipe also connecting the heater with the water jacket of the engine, an auxiliary tank mounted upon the dashboard of the vehicle, and means forming communication between the same and the first named pipe.

In testimony whereof I affix my signature, in presence of two witnesses.

NELSON R. SMITH.

Witnesses:
MARY HIGGINS,
A. EBERT O'BRIEN.